United States Patent [19]

Fisler

[11] 4,090,189

[45] May 16, 1978

[54] BRIGHTNESS CONTROL CIRCUIT FOR LED DISPLAYS

[75] Inventor: Charles F. Fisler, New Hartford, N.Y.

[73] Assignee: General Electric Company, Syracuse, N.Y.

[21] Appl. No.: 688,474

[22] Filed: May 20, 1976

[51] Int. Cl.$^2$ ...................... G09B 13/00; H05B 39/00; H05B 41/00

[52] U.S. Cl. .................................... 340/335; 340/340; 340/324 R; 315/169 TV

[58] Field of Search ............ 315/169 R, 169 TV, 208, 315/245, 291, 297; 340/334, 335, 340, 154, 324 R

[56] References Cited

U.S. PATENT DOCUMENTS 3,493,956 2/1970 Andrews et al. .................... 340/334

*Primary Examiner*—Maynard R. Wilbur
*Assistant Examiner*—T. M. Blum
*Attorney, Agent, or Firm*—Marvin A. Goldenberg

[57] ABSTRACT

A brightness control circuit for use with light emitting (LED) displays, or comparable electronic displays that are energized from a source of DC potential that supplies periodic pulses of constant peak current to the display elements, the display brightness being controlled as a function of the pulse duty cycle so as to achieve a uniform and continuous control of the display over a relatively wide range of brightness levels, extending particularly into the lower brightness region. Energizing current is coupled to the display by a transistor switching means actuated at a given frequency and with a duty cycle that is a function of the brightness control setting.

7 Claims, 8 Drawing Figures

BRIGHTNESS CONTROL CIRCUIT FOR LED DISPLAYS

BACKGROUND OF THE INVENTION

The invention pertains to electronic displays and to control circuitry for controlling the light output of these displays. In the more common type of brightness control circuit for electronic displays, the current supplied to the display elements is controlled as a function of the amount of illumination desired from the display. This is normally done by adjusting a resistance through which the energizing current flows, or by adjusting the supply voltage as applied through an emitter follower circuit. In addition to being inefficient and wasteful of energy, these forms of control have a limited range over which the illumination can be linearly controlled and tends to turn off completely at low brightness. As a related matter, the control circuit may be subject to temperature instabilities and excessive variations in component tolerances, giving rise to a nonuniform illumination from the display elements.

SUMMARY OF THE INVENTION

It is accordingly one object of the invention to provide an improved brightness control circuit for LED and comparable electronic displays that provides a continuous control of the display elements over a wide range of brightness levels, extending particularly into the low brightness region.

Another object of the invention is to provide a brightness control circuit that provides uniform illumination from the display elements over a wide range of brightness levels.

A further object of the invention is to provide a brightness control circuit which is of relatively simple circuit configuration and may be inexpensively constructed.

Another object of the invention is to provide a brightness control circuit that is highly reproducible on a mass production basis.

These and other objects of the invention are accomplished in accordance with one aspect of the invention by a brightness control circuit for controlling the current flow from a source of energizing potential to an electronic display, the output of said potential source being coupled through a transistor switching means for supplying pulses of approximately constant peak current to the display elements. The transistor switching means is controlled so as to provide a periodic on/off operation having a duty cycle that is varied to control the brightness of the display. The operation of the transistor switching means is controlled as a function of a drive signal of approximately constant peak voltage derived from a capacitive charge-discharge circuit. This circuit includes a capacitor that is charged through a serially connected charge circuit means which includes a brightness control resistor whose resistance is adjusted for a selected condition of brightness to determine the initial rate of charge of said capacitor voltage, the capacitor being periodically and briefly discharged through a discharge transistor. During the charge time the capacitor voltage is made to exceed a given threshold voltage Vth, and during discharge the capacitor voltage is reduced toward a reference level that is below Vth. A threshold voltage sensing transistor having its input coupled to the capacitor through a resistor voltage divider circuit and its output coupled to the input of the transistor switching means responds to the voltage across the capacitor and derives at its output a drive signal having a duty cycle that is dependent upon the relative time said capacitor voltage is above and below Vth. Thus, the threshold voltage sensing transistor provides the transistor switching means with a precise on/off operation.

In accordance with a further aspect of the invention, circuit means are provided for periodically actuating the threshold voltage sensing transistor irrespective of the voltage across the capacitor, to ensure that this transistor will not remain continuously in a single operating state should the capacitor voltage fail to be reduced below Vth during discharge.

BRIEF DESCRIPTION OF THE DRAWING

While the specification concludes with the claims which particularly point out and distinctly define that subject matter which is regarded as the invention, it is believed that the invention will be more clearly understood when considering the following detailed description taken in connection with the accompanying figures of the drawing in which:

DESCRIPTION OF THE PREFERRED EMBODIMENT

Figure 1:
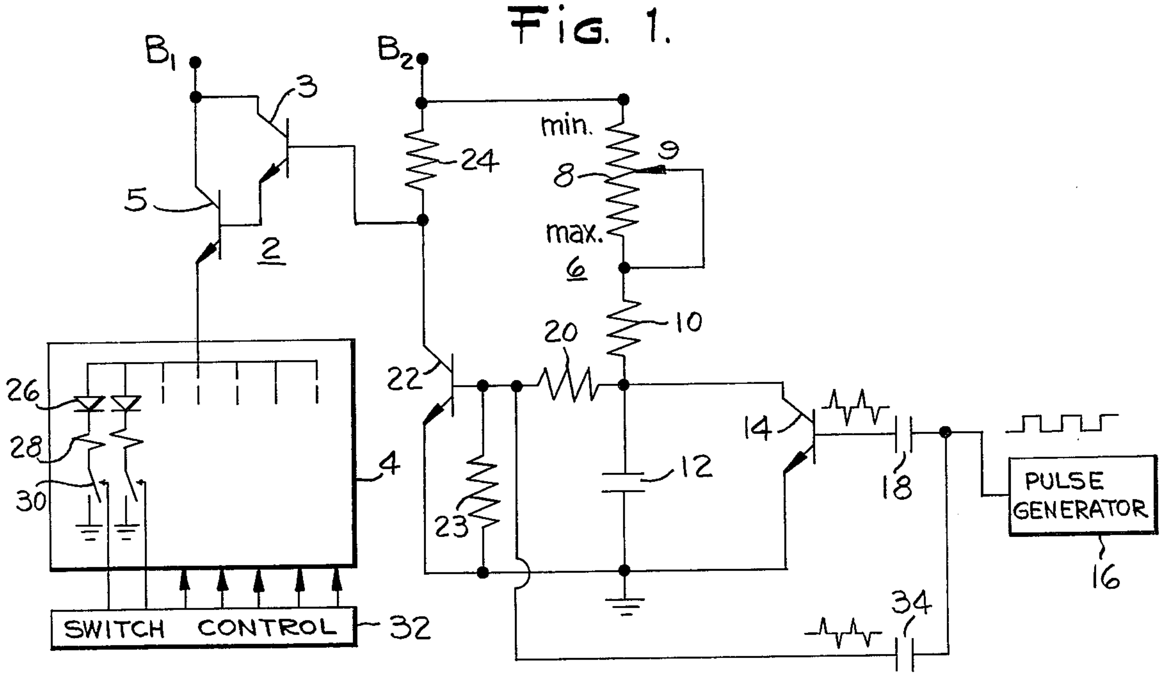
FIG. 1 is a schematic circuit diagram of a brightness control circuit for controlling the illumination of an LED display.

With reference to FIG. 1 of the drawing, there is illustrated a schematic circuit diagram of a brightness control circuit for use with an LED or comparable electronic display, which includes a source of DC potential B1 that is applied through a transistor switching means 2 to an LED display 4. Transistor switching means 2 is in the form of a Darlington pair of NPN transistors 3 and 5 connected with their collectors joined together to B1, and providing a constant peak voltage output at the emitter of transistor 5 in an emitter follower configuration with the components of the LED display 4. A second source of DC potential B2 is applied through a brightness control resistance 6, composed of a tapped resistor 8 connected in series with a fixed resistor 10, to one side of a charge-discharge capacitor 12. For an efficient operation of the transistor switching means 2, the voltage of B2 is made greater than that of B1. The other side of capacitor 12 is connected to ground. The tap for resistor 8 has one fixed terminal connected to the junction of resistors 8 and 10 and a movable contact selectively positioned at a point on resistor 8 between the extreme maximum and minimum brightness positions. The resistor 8 thus provides a variable resistance for developing a voltage across capacitor 12 in accordance with the level of brightness desired from the display.

An NPN transistor 14 is coupled in shunt with capacitor 12 for periodically discharging capacitor 12. The collector of transistor 14 is connected to the one side of capacitor 12 and its emitter is connected to ground. A pulse train from pulse generator 16, which may be of conventional form, is coupled through a first differentiating capacitor 18 to the base of transistor 14. In response to the positive spikes of the differentiated pulse train, transistor 14 is periodically and briefly turned fully on for discharging the capacitor 12. The one side of capacitor 12 is also coupled through a resistor 20 to the base of a further NPN transistor 22, the base also being connected through a resistor 23 to ground. This transistor has its emitter connected to ground and its collector connected through a resistor 24 to source B2 and to the input of the Darlington pair at the base electrode of transistor 3. The transistor 22 responds to the voltage across capacitor 12 to become fully conductive when this voltage exceeds a threshold level that is established by the Veb of transistor 22, and to be nonconductive when the capacitor voltage is below the threshold level. Transistor 22 derives a drive signal for the transistor switching means 2 at its collector that is of constant peak voltage and has a duty cycle that is a function of the relative time the capacitor voltage is above and below the threshold level.

The LED display 4 is schematically represented as a matrix of current paths coupled in parallel, each path including the serial connections of a light emitting diode 26, a fixed resistor 28 and a switch 30. The switch 30 is illustrated as a mechanical component for simplicity but in a practical embodiment both the resistor 28 and switch 30 would normally be incorporated in a transistor switching device. The diodes 26 have their anodes joined together. The switches 30, with one terminal at ground, are selectively operated by a conventional switch control circuit 32 for connecting different combinations of LED current paths into the circuit in accordance with a particular information to be displayed. It is noted that the fixed resistors 28 are of equal value so that pulses of constant peak current are supplied to each of the LED elements connected into the circuit, irrespective of the number of such connected elements.

A second differentiating capacitor 34, having one side coupled to the output of pulse generator 16 and its other side coupled to the base of transistor 22, applies a differentiated pulse to said transistor. In response to the negative and positive spikes of the differentiated pulses, transistor 22 is caused to periodically turn off and turn on, respectively, irrespective of the voltage across the capacitor 12. Of particular importance are the negative spikes which in periodically turning off transistor 22 ensure that the display cannot turn fully off during settings of low brightness.

In considering one exemplary embodiment of applicant's invention, the circuit of FIG. 1 may employ the following component types and component values, which are given by way of example and not intended to be limiting of the invention:

| | |
|---|---|
| Transistors | |
| 3, 5, 14, 22 | Type 2N3416 |
| Diodes | |
| 26 | Light Emitting Diodes |
| Resistors | |
| 7 | 2 Megohm |
| 10 | 4.7 K ohm |
| 20 | 390 K ohm |
| 23 | 100 K ohm |
| 24 | 27 K ohm |
| 28 | 300 ohm |
| Capacitors | |
| 12 | .05 mf |
| 18, 34 | 470 pf |
| Source Potential | |
| B1 | 6 volts |
| B2 | 27 volts |

In the operation of the circuit of FIG. 1, capacitor 12 is charged from source B2 through the brightness control resistors 8 and 10. The movable contact 9 is set along the resistor 8 between maximum and minimum brightness positions to adjust the brightness level of the display. As will be seen, actual control of the display's light output brightness is accomplished through controlling the duty cycle of the drive signal applied to transistor switching means 2.

Changing the position of contact 9 adjusts the RC time constant for charging the capacitor 12, which is determined predominantly by the amount of resistance of resistor 8 connected into the circuit, the resistance of resistor 10 and the capacitance of capacitor 12. In adjusting this time constant, the rate at which voltage is developed across the capacitor 12 is correspondingly adjusted. The rate of voltage build-up is employed to control the duty cycle of the drive signal for switching means 2, as will be more clearly seen.

A discharge path for capacitor 12 is provided through transistor 14. As previously noted, the positive spikes of the differentiated pulses from pulse generator 16 act to briefly turn fully on transistor 14 for inserting the discharge path into the circuit. A graph of these positive spikes is illustrated in FIG. 2D. The time for charging capacitor 12 is the time between positive voltage spikes, which is the pulse period less the spike width. In the embodiment under consideration, the pulse period is conveniently 1/60 second and the spike width approximately 1/10 millisecond. The charge RC time constant, which is a measure of the initial rate of change of voltage developed across the capacitor, may be adjusted from less than a millisecond, which is a fraction of the charge time, to several times the charge time such as over 100 milliseconds. The discharge RC time constant for optimum operation is substantially less than the spike width of 1/10 milliseconds so as to permit complete discharge of capacitor 12.

Figure 2A:
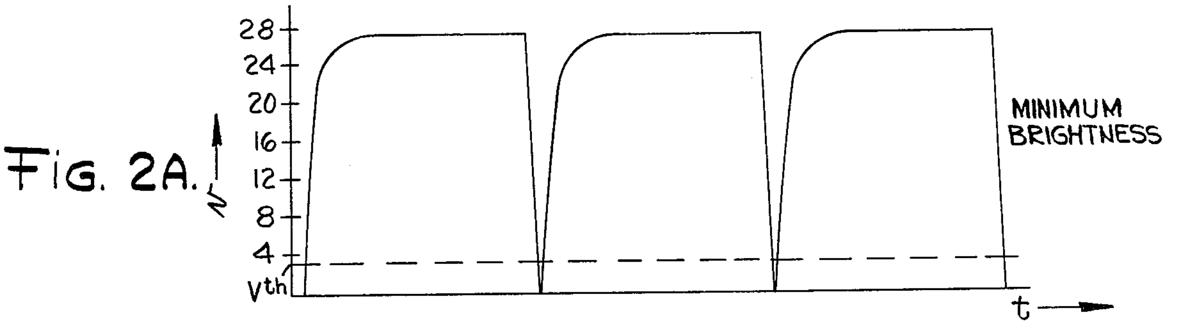
FIGS. 2A, 2B, 2C and 2D are graphs of various waveforms pertaining to the operation of the circuit of FIG. 1.
Figure 2B:
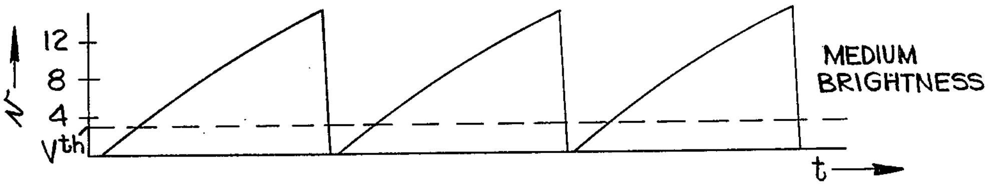
Figure 2C:
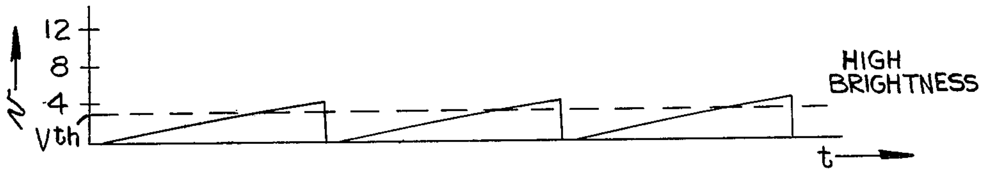
Figure 2D:
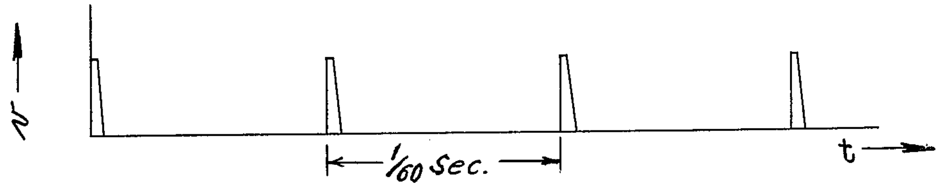

When contact 9 is set for minimum brightness, which inserts a minimum amount of resistance into the charge circuit, voltage is rapidly developed across the capacitor 12 at maximum initial rate of change, as shown in the capacitor voltage vs. time curve of FIG. 2A. It is seen that the capacitor voltage rapidly builds up to its maximum value and remains at this value during most of the charge time. Correspondingly, as the setting of contact 9 is adjusted for successively greater brightness, the charge resistance is increased to develop voltages across the capacitor 12 at successively lower initial rates of change. FIGS. 2B and 2C show capacitor voltage curves for selected medium and high brightness conditions, respectively, bearing in mind there may be numerous other brightness settings, each exhibiting its own capacitor voltage curve. In FIG. 2B the voltage develops to about half the maximum value during the charge time, and in FIG. 2C it develops to a relatively low value. From FIGS. 2A, 2B and 2C, it is seen that the capacitor 12 is charged at an initial rate corresponding to the selected brightness setting to a resulting voltage, and is then rapidly discharged, the charge-discharge operation being done in a cyclical manner at an established frequency. While the voltage developed across the capacitor at the end of the charge time is a function of the initial rate of change of voltage and the charge time, of principal importance to the operation of the circuit is the initial rate of change of voltage and the ratio of the time the voltage is above and below an established threshold level Vth.

During the time when the capacitor 12 voltage exceeds the threshold level Vth, transistor 22 will conduct. The threshold level Vth is determined by the Veb of transistor 22 as voltage multiplied by resistors 20 and 23, and may be expressed by the equation:

$$Vth = Veb\,(R20 + R23/R23)$$

Upon conduction of transistor 22 its collector voltage is reduced, which applies a signal to the base of transistor 3. This causes the transistors of switching means 2 to be nonconducting and thereby prevents energization of the LED display 4. Conversely, during the time when the capacitor 12 voltage is below the threshold level Vth, transistor 22 is turned off and its collector voltage increased to cause the transistors of switching means 2 to conduct and thereby apply energizing current to the display 4.

Thus, the ratio of the time the capacitor 12 voltage is below Vth to the time it is above Vth determines the duty cycle of the drive signal applied from the collector of transistor 22 to the base of the transistor 3 of switching means 2. The brightness of the display is directly related to the magnitude of the duty cycle.

In the operation under consideration, Veb was approximately 0.6 volts, Vth approximately 3 volts and the voltage across the display 4 in its energized condition was approximately 6 volts.

Figure 3A:
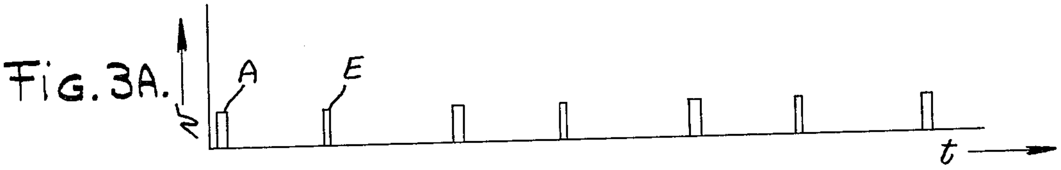
FIGS. 3A, 3B and 3C are also graphs of various waveforms pertaining to the circuit operation.

As illustrated in FIG. 2A, showing the capacitor voltage curve for a minimum brightness condition, the capacitor voltage during initiation of the charge period rapidly exceeds Vth, which is indicated as equal to about 3 volts, and remains above this level until the discharge period when the capacitor voltage falls precipitously. In an optimum operation, the voltage falls to zero but, as will be seen, it may not always do so. At the initiation of the subsequent charge period, it again rapidly increases to exceed Vth. The duty cycle of the drive signal from the collector output of transistor 22 for this operation of the circuit is very low as shown by pulses A in FIG. 3A. Pulses E are due to negative voltage spikes applied to the base of transistor 22 through differentiating capacitor 34, an additional feature of the circuit as will be discussed.

Figure 3B:
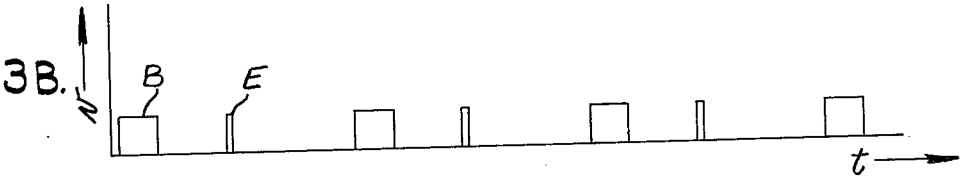
Figure 3C:
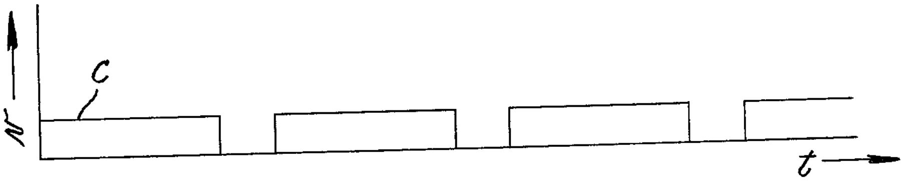

In FIG. 2B, illustrating a medium level of brightness, the capacitor voltage rises less rapidly and takes more time to exceed Vth. Accordingly, the duty cycle of the drive signal is increased from that previously considered, as shown by the pulses B in FIG. 3B. Referring to FIG. 2C, illustrating a high brightness condition, the capacitor voltage rises relatively slowly so as to exceed Vth in the latter portion of the charge period. Thus, the duty cycle of the drive signal in this type operation is relatively high, as shown by the pulses C in FIG. 3C.

As previously mentioned, because of an unavoidable imprecision in the circuit operation due to component tolerances and the like, for conditions of minimum and low brightness, as shown by the capacitor voltage curve in FIG. 2A, the capacitor voltage may not be fully discharged during the brief discharge period and therefore may continuusly remain above the threshold Vth. Should this occur, the duty cycle would become zero and the display turned fully off. To avoid such occurrence, the negative spikes of the differentiated pulses formed by capacitor 34 in being applied to the base of transistor 22, ensure that this transistor will briefly turn off at least once each cycle. This is illustrated by the pulses E in FIGS. 3A and 3B. Because of the briefness of this action, there is no significant effect on the overall circuit operation in respect to the brightness control.

In addition, it may be appreciated that the positive spikes of the differentiated pulses from capacitor 34 in being applied to the base of transistor 22 at the same time the transistor 14 is made conducting will tend to maintain conduction of transistor 22 during the discharge period. This will reduce the duty cycle slightly for each brightness setting. However, since the discharge period is very short, the overall operation of the control circuit is not significantly affected by this action.

It may be appreciated that numerous changes and modifications can be made to the present circuitry without exceeding the teachings herein provided, and the appended claims are intended to include within their range all such changes and modifications.

What is claimed as new and desired to be secured by Letters Patent of the United States is:

1. A brightness control circuit for controlling the current flow from a source of energizing potential to an electronic display for thereby controlling the light output brightness of said display, comprising:

a. a charge-discharge capacitor coupled to a point of fixed reference voltage, b. charge circuit means for developing a voltage across said capacitor that will exceed a given threshold voltage Vth with respect to said reference voltage, c. discharge circuit means for periodically reducing the capacitor voltage toward said reference voltage, d. said charge circuit means including an adjustable element that adjusts the initial rate of change of said capacitor voltage in accordance with a selected display brightness so that the time required for the voltage to exceed Vth is likewise in accordance with said display brightness, e. threshold voltage sensing means for deriving a drive signal having a duty cycle that is a function of the relative time said capacitor voltage is above and below Vth, f. switching means for coupling said source of energizing potential to said display, and g. means for applying said drive signal to said switching means so as to control its operation as a function of said duty cycle.

2. A brightness control circuit as in claim 1 wherein said charge circuit means is connected in series with said capacitor and the adjustable element thereof comprises an adjustable resistor.

3. A brightness control circuit as in claim 2 wherein said discharge circuit means includes a discharge transistor whose emitter-collector circuit is connected in parallel with said capacitor, said discharge transistor being periodically actuated for providing a brief and rapid discharge of said capacitor.

4. A brightness control circuit as in claim 3 wherein said threshold voltage sensing means includes a further transistor whose base-emitter circuit is in a path in parallel with said capacitor so that its operating state is determined by said capacitor voltage, said drive signal appearing at the collector of said further transistor.

5. A brightness control circuit as in claim 4 wherein said threshold sensing means also includes a resistor divider circuit having one resistor arm in said path and another arm in parallel with said base-emitter circuit, whereby the voltage across the base-emitter of said further transistor is a fraction of said capacitor voltage as determined by said resistor divider circuit.

6. A brightness control circuit as in claim 5 wherein said drive signal is of approximately constant peak voltage and said switching means includes a transistor means connected in an emitter follower configuration for applying to said display pulses of approximately constant peak current.

7. A brightness control circuit as in claim 5 that further includes actuating means for providing periodic and brief actuation of said further transistor irrespective of said capacitor voltage for ensuring that this transistor will not remain continuously in a single operating state should the capacitor voltage fail to be reduced below Vth during discharge.

* * * * *